(12) United States Patent
Barnholt et al.

(10) Patent No.: US 6,364,803 B1
(45) Date of Patent: Apr. 2, 2002

(54) DIFFERENTIAL AXLE ASSEMBLY WITH ADJUSTABLE GEAR OFFSET

(75) Inventors: Mark C. Barnholt, Fort Wayne; Thomas L. Nahrwold, Ossian; John E. Pressler, Roanoke, all of IN (US); Edward E. Stuart, Payne, OH (US); David J. Young, Kimmell, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/568,582

(22) Filed: May 11, 2000

(51) Int. Cl.⁷ .......................... F16H 48/10; F16H 35/06
(52) U.S. Cl. .......................... 475/246; 475/230; 74/396
(58) Field of Search .......................... 475/230, 246, 475/247; 74/607, 409, 410, 417, 396

(56) References Cited

U.S. PATENT DOCUMENTS

| | | | |
|---|---|---|---|
| 962,059 A | 6/1910 | Shirley | |
| 1,076,560 A | * 10/1913 | Duffy | .......................... 475/247 |
| 1,946,051 A | 2/1934 | Alden | |
| 2,015,969 A | 10/1935 | Schildknecht | |
| 2,056,881 A | 10/1936 | Alden | |
| 2,203,292 A | * 6/1940 | Best | .......................... 475/246 |
| 2,557,937 A | * 6/1951 | Buckendale | .......................... 475/246 |
| 2,561,335 A | 7/1951 | Buckendale | |
| 3,213,700 A | 10/1965 | Brownyer | |
| 3,310,999 A | 3/1967 | Griffith | |
| 3,318,173 A | * 5/1967 | Puidokas | .......................... 475/246 X |
| 3,323,844 A | 6/1967 | Hedstrom | |
| 3,726,154 A | 4/1973 | Diessner | |
| 4,402,238 A | * 9/1983 | Craig | .......................... 475/230 |
| 4,543,853 A | * 10/1985 | Hiddessen et al. | .......................... 74/607 X |
| 5,806,371 A | 9/1998 | Hibbler et al. | |
| 6,068,571 A | * 5/2000 | Irwin | .......................... 475/230 |
| 6,093,127 A | * 7/2000 | DiDomenico et al. | .......................... 475/230 |

* cited by examiner

Primary Examiner—Charles A. Marmor
Assistant Examiner—Ha Ho
(74) Attorney, Agent, or Firm—Liniak, Berenato, Longacre & White

(57) ABSTRACT

An adjustable pinion offset in a differential axle assembly. The offset between a pinion gear and shaft relative to a ring gear in the differential axle assembly is adjustable due to an eccentric mounting of the pinion assembly relative to the differential housing containing the ring gear. The pinion shaft is eccentrically mounted within a bore of the differential housing such that a simple rotation of the pinion assembly about the eccentric pilot mounting adjusts the position of the pinion shaft with respect to the ring gear to adjust pinion offset. Once properly positioned, the pinion assembly is secured to the differential housing to maintain the desired position. This invention substantially reduces the noise associated with gear offset error.

11 Claims, 4 Drawing Sheets

US 6,364,803 B1

DIFFERENTIAL AXLE ASSEMBLY WITH ADJUSTABLE GEAR OFFSET

BACKGROUND OF THE INVENTION

1. Field of the Invention

The invention is related to adjustment and assembly of parts in an automotive axle assembly. More particularly, the invention is an offset pinion shaft and gear in a differential axle assembly featuring simple adjustment capabilities to control the relative position of the pinion gear and ring gear.

2. Description of Related Art

Automotive manufacturers are concerned with the problem of axle gear noise and are seeking ways to insure a quite gear mesh. Without a means to adjust relative pinion gear position within a differential axle assembly, the gear noise is dependent upon the machining accuracy of the carrier housing of the ring gear and pinion gear. The offset position is critical to quite operation of the gear set and is often beyond the machining capability of the carrier housing. Adjustability of the offset position offers a much-needed solution to the noise problem and is presented herein by the present invention.

In prior art axle designs, the pinion gear position is not readily adjustable and the resulting pinion gear to ring gear offset is difficult to maintain with precision. Even by employing great care and expense during machining of the carrier housings, a significant offset error exists, and when the carrier housing does not match the desired gear offset precisely, the gear mesh will produce noise during operation.

Accordingly, it is an object of the invention to provide a means for adjusting pinion gear position in a differential axle assembly.

It is another object of the invention to achieve an optimal gear mesh between a pinion gear and ring gear in an axle assembly thereby reducing gear set noise during operation.

It is a further object of the invention to utilize a two-piece carrier housing for a differential axle assembly to allow for adjustability of a pinion assembly relative to a differential housing.

It is another object of the invention to provide an eccentric pilot for the pinion assembly such that rotation of the pinion assembly adjusts pinion gear offset.

A specific object of the invention is to allow for lateral and axial adjustment of the pinion assembly relative to the differential housing.

It is a further object of the invention to achieve quiet operation of a gear set in a differential axle assembly.

SUMMARY OF THE INVENTION

The invention is a differential axle assembly having an adjustable gear mesh. The assembly includes a differential housing, a ring gear rotatably mounted within the differential housing, and a pinion assembly having a pinion gear driving the ring gear during operation of the differential axle assembly. The pinion assembly is eccentrically mounted within a bore of the differential housing such that the gear mesh between the pinion gear and the ring gear is adjustable by rotation of the pinion assembly within the bore.

The invention also provides a device for positioning the pinion assembly in an axial direction with respect to an axis of rotation of the pinion gear and to a centerline of the bore. This device includes at least one shim mounted between the differential housing and the pinion assembly.

The differential axle assembly according to the invention can have a pinion assembly which is offset relative to the ring gear, or a pinion assembly that has a theoretical offset of zero relative to the ring gear.

The pinion assembly according to the invention includes a pinion carrier having an inner bearing and an outer bearing bore with concentric centerlines. The pinion carrier has an outer circumferential surface with an eccentric centerline relative to the inner and outer bearing bore centerlines. The inner and outer pinion bearings are seated within the inner and outer bearing bores respectively. The pinion shaft is supported for rotation by the inner and outer pinion bearings such that an axis of rotation of the pinion shaft is aligned with the centerlines of the inner and outer bearing bores. However, the pinion shaft is eccentric with respect to the centerline of the outer circumferential surface of the pinion carrier. The outer circumferential surface of the pinion carrier is mounted within the bore of the differential housing.

The invention provides for a differential axle assembly with an adjustable offset between a ring gear and a pinion gear. The axle assembly includes a differential housing supporting a differential case including the ring gear and differential gearing. The differential case is supported by the differential housing for rotation on a pair of roller bearings. A pinion assembly carrier supports a pinion gear and pinion shaft for rotation on a pair of roller bearings. The pinion assembly is mounted eccentrically within a bore of the differential housing such that rotation of the pinion carrier within the bore adjusts the offset between the ring gear and the pinion gear.

The differential housing and the pinion assembly are joined at a bolted flange joint. The bolted flange joint includes a circumferential differential housing flange surrounding the bore in the differential housing. The circumferential differential housing flange has threaded holes to receive screws. A circumferential pinion carrier flange surrounds the pinion carrier. The pinion circumferential carrier flange has mounting slots for the screws to pass through and the mounting slots are circumferentially extended along the pinion circumferential carrier flange to enable rotational adjustment of the pinion carrier relative to the differential housing. Upon a completed rotational adjustment of the pinion assembly relative to the differential housing, the screws are tightened to maintain the desired position.

BRIEF DESCRIPTION OF THE DRAWINGS

The above mentioned advantages and objects of the present invention will further become apparent when taken with the detailed description of the invention and with the drawings in which.

DETAILED DESCRIPTION OF THE INVENTION

Figure 1:
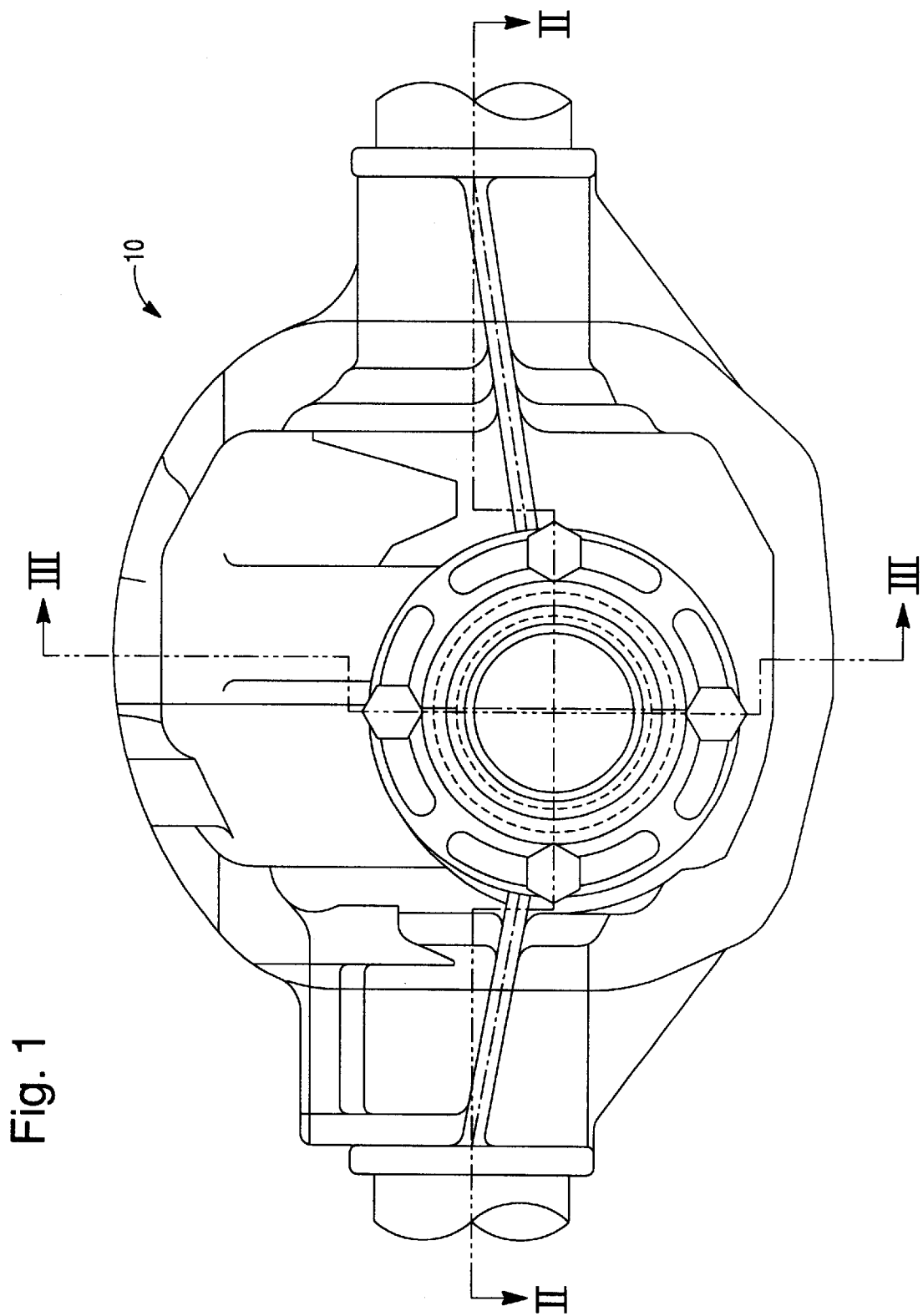
FIG. 1 shows a partial sectional view of an axle housing according to the invention looking axially at the pinion assembly and an eccentric pilot mounting.
Figure 2:
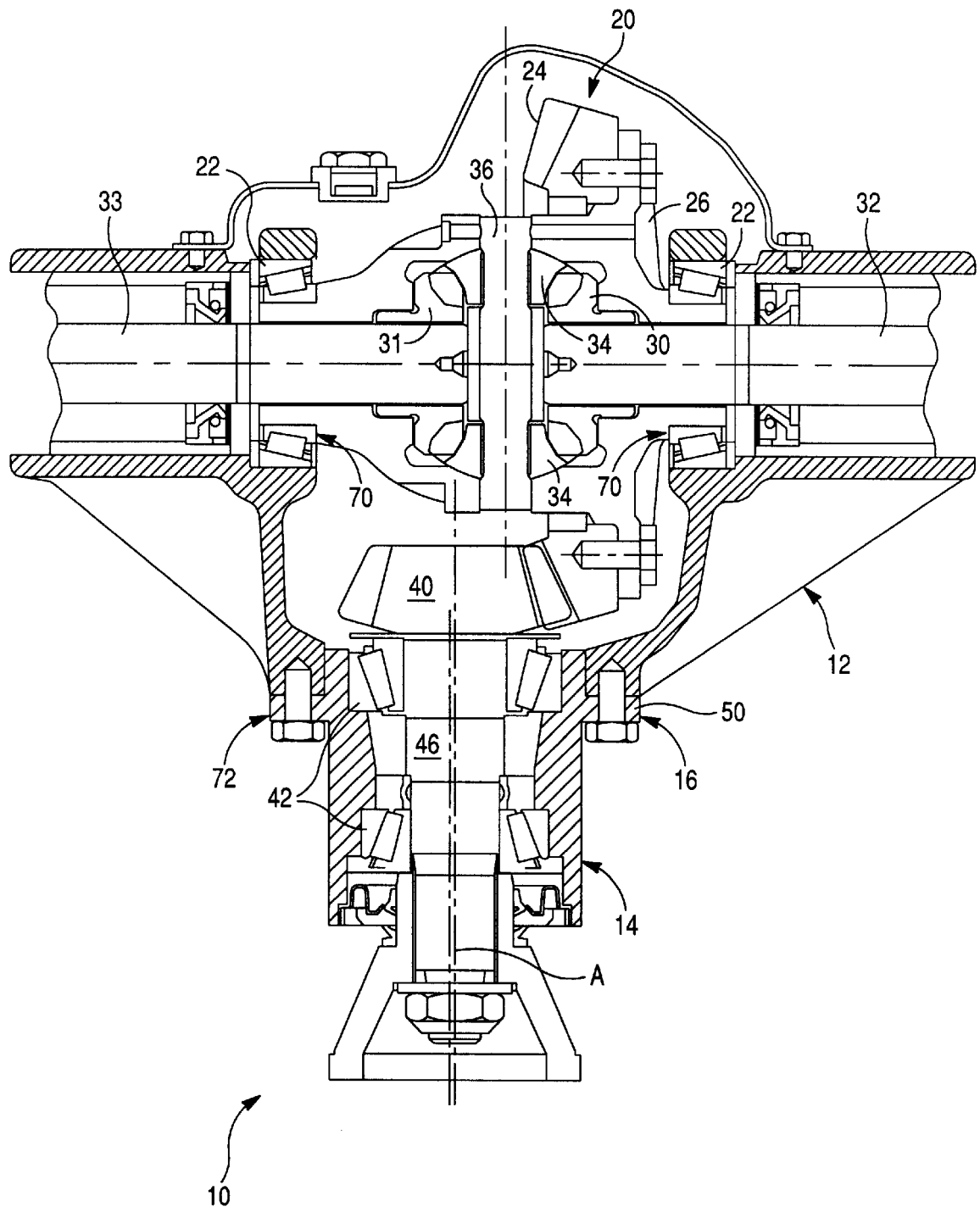
FIG. 2 depicts a sectional view of FIG. 1 taken along line II—II.

Referring now to FIG. 1, a partial sectional view of an axle housing looking axially at a pinion assembly and an eccentric pilot mounting as will be described hereinafter. FIG. 2 depicts a sectional view of FIG. 1 taken along line II—II. Here the present invention is shown in a differential axle assembly 10 formed of at least two separate pieces 12, 14. A first piece of the differential axle assembly is a differential housing 12 that supports the differential gearing and differential case assembly 20. The differential housing 12 supports the differential case assembly 20 on a pair of roller bearings 22. The differential case assembly 20 includes the ring gear 24 and differential case 26 which are driven by a drive pinion assembly 40. The differential case assembly 20 also includes a pair of opposed differential side bevel gears 30, 31 and their respective differential axle shafts 32, 33, and a series of bevel pinions 34 each rotatably mounted on pinion shaft 36 mounted to the differential case 26.

A second piece of the differential axle assembly 10 is the pinion assembly 14 which supports the drive pinion assembly 40 on a pair of roller bearings 42. The drive pinion assembly 40 also includes a drive pinion gear 44 and drive pinion shaft 46. The differential housing 12 and the pinion assembly 14 are joined at a bolted flange joint 16.

Figure 3:
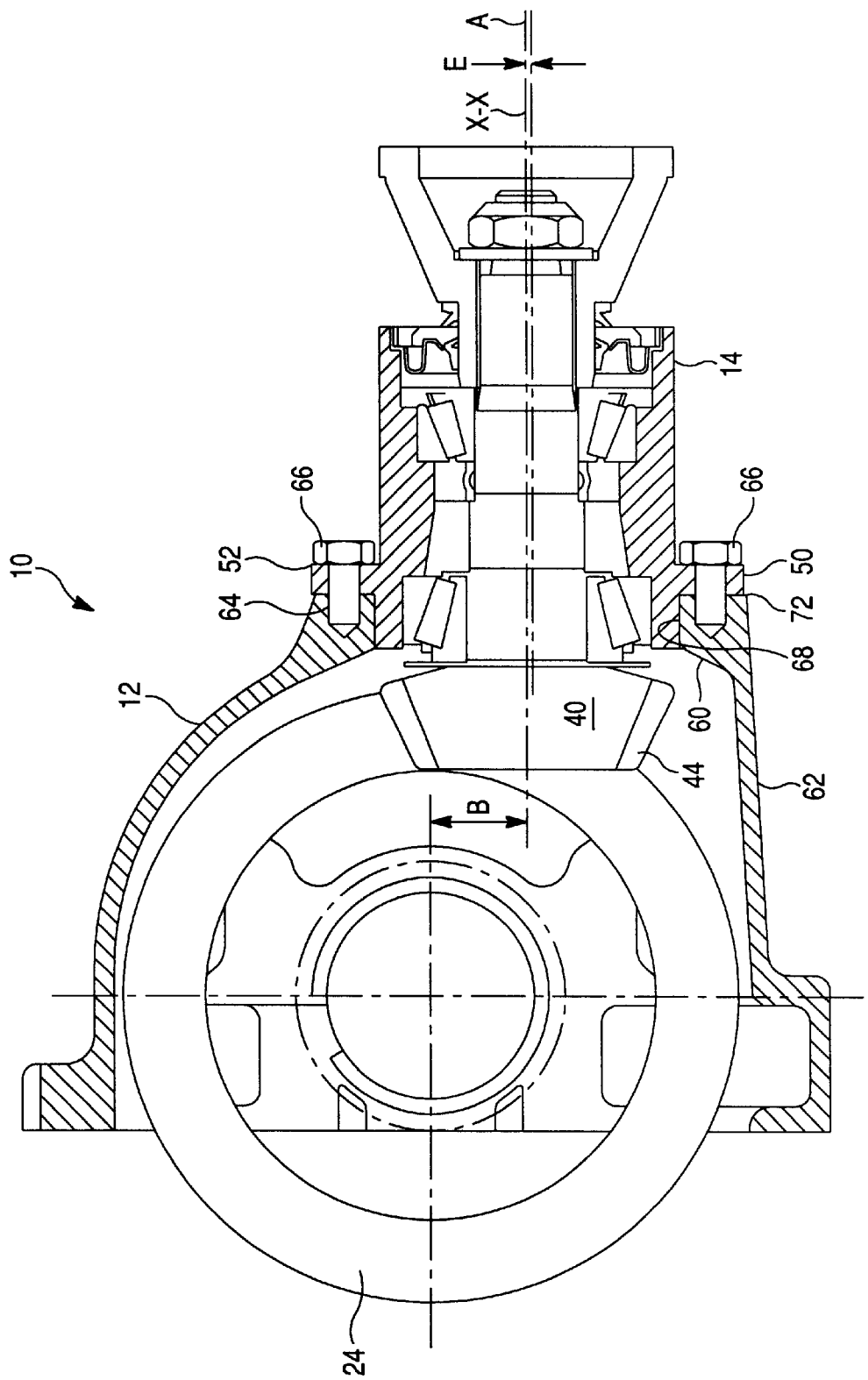
FIG. 3 illustrates a sectional view of the axle housing of FIG. 1 taken along line III—III showing the offset of the gear set.
Figure 5:
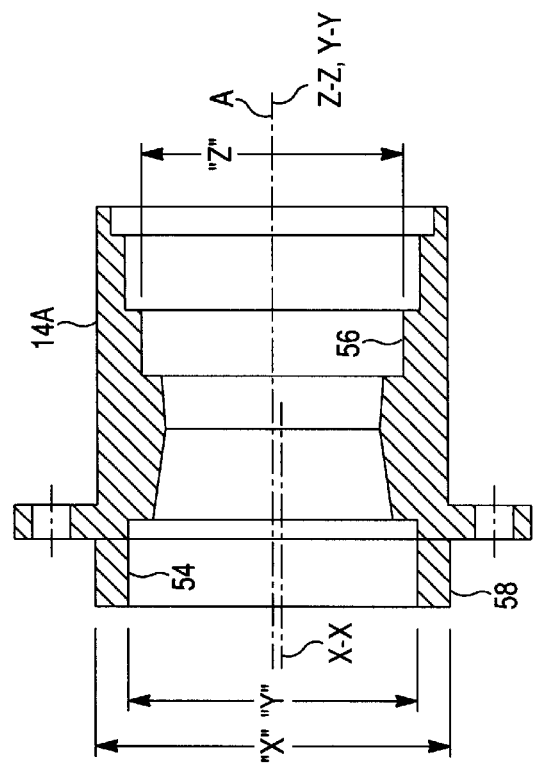
FIG. 5 shows a cross-sectional view of FIG. 4 taken along line V—V of the pinion carrier according to the present invention.
Figure 4:
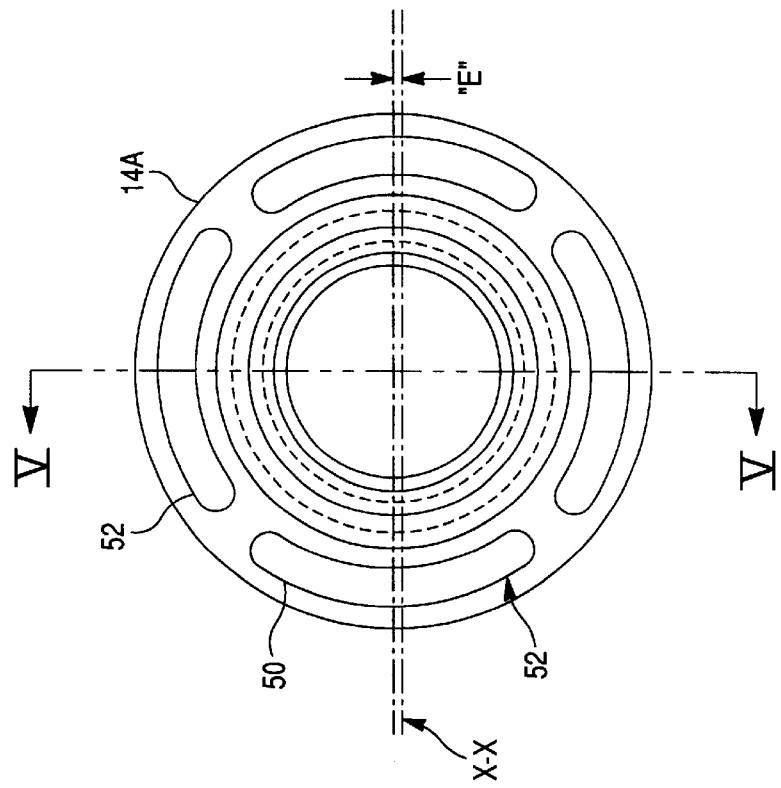
FIG. 4 shows an axial sectional view of the details of the pinion carrier according to the invention.

Referring now additionally to FIGS. 3 and 4, the pinion assembly 14 is generally cylindrical and is provided with a circumferential pinion carrier flange 50. A hollowed extension 60 on the differential housing 12 is provided with a circumferential differential housing flange 62 which has threaded holes 64 to receive screws 66 passing through circumferentially spaced mounting slots 52 in the circumferential pinion carrier flange 50 to join the two-piece differential axle assembly 10. The circumferentially-spaced mounting slots 52 are circumferentially extended along the circumferential pinion carrier flange 50 to enable rotational adjustment of the pinion carrier 14A relative to the differential housing 12, which will be further describe hereinafter.

The inside of the pinion carrier 14A is provided with an inner bearing bore 54 having a diameter Y and an outer bearing bore 56 having a diameter Z. The inner and outer bearing bores 54, 56 have concentric centerlines y-y, z-z, respectively. The inner and outer pinion roller bearings 42 are seated in the inner and outer bearing bores 54, 56 to support the drive pinion shaft 46 for rotation such that the drive pinion shaft axis A of rotation is aligned with the inner and outer bearing bore centerlines y-y, z-z.

The outer circumferential cylindrical surface 58 of the pinion carrier 14A is radially outward from the inner bearing bore 54 and has a pilot diameter X. The centerline x-x of pilot diameter X is eccentric relative to the inner and outer bearing bore centerlines y-y, z-z, as designated by reference symbol E. The pinion carrier circumferential cylindrical surface 58 is mounted within a bore 68 of the differential housing 12 located at the hollowed extension 60. The eccentric pilot E causes the drive pinion assembly 40 to be mounted eccentrically relative to the bore 68 in the differential housing 12. By turning the pinion assembly 14 on the eccentric pilot E the offset can be adjusted with desired precision. Upon assembly of the pinion assembly 14 to the differential housing 12, the offset is adjusted to the desired position by the rotational movement of the pinion assembly 14 allowed by the arcuate, circumferentially-spaced mounting slots 52, then the screws 66 are tightened to maintain the desired position.

FIG. 3 illustrates a sectional view of the axle housing of FIG. 1 taken along line III—III and shows the offset B of the gear set. The figures used to show the present invention show a common case of the offset B of the gear set where the drive pinion gear 44 is offset below the ring gear 24. However, it will be appreciated that the invention as described in the exemplary embodiment can be applied when the drive pinion gear is offset above the ring gear, and for spiral bevel gearing where the gear offset is theoretically zero.

The eccentric pilot diameter X is responsible for repositioning of the pinion assembly 40 in the critical vertical direction, as viewed in FIG. 3, but also in the horizontal direction, as will be understood by those skilled in the art. Referring again to FIGS. 2 and 3, the axial position of the differential case assembly 20 is set or corrected at a later stage of the assembly of the differential axle assembly 10, when shims 70 are added on either side of the differential roller bearings 22 to set gear backlash and differential bearing preload. A shim 72 is also positioned at the bolted flange joint 16 to position the drive pinion gear 44 axially with respect to its rotational axis A. The housing axial adjustments are completed by the shims 70, 72 positioning the differential case assembly 20 and the drive pinion gear 44 by providing the needed adjustments to position the gear set properly. With these fine adjustment capabilities provided by the present invention, the desired offset can be precise and quiet operation of the gear mesh is achieved.

Having thus described various exemplary embodiments of the invention, it will be understood by those skilled in the art that modifications or changes in details of the invention may be implemented without departing from the spirit and scope of the invention as defined in the following claims.

What is claimed is:

1. A differential axle assembly having an adjustable gear mesh comprising:
    a differential housing;
    a ring gear rotatably mounted within the differential housing; and
    a pinion assembly having a pinion gear driving said ring gear during operation of said differential axle assembly, wherein said pinion assembly is eccentrically mounted within a bore of the differential housing such that the gear mesh between the pinion gear and the ring gear is adjustable by rotation of said pinion assembly within said bore thereby adjusting a radial offset between said pinion gear and said ring gear.

2. The differential axle assembly according to claim 1, further comprising: axial positioning means for positioning the pinion assembly in an axial direction with respect to an axis of rotation of the pinion gear and to a centerline of said bore without removing pinion bearings.

3. The differential axle assembly according to claim 2, wherein said axial positioning means comprises at least one shim mounted between said differential housing and said pinion assembly.

4. The differential axle assembly according to claim 1, wherein the pinion assembly is offset relative to said ring gear.

5. The differential axle assembly according to claim 1, wherein the pinion assembly has a theoretical offset of zero relative to said ring gear.

6. A differential axle assembly having an adjustable gear mesh comprising:
    a differential housing;
    a ring gear rotatably mounted within the differential housing; and
    a pinion assembly having a pinion gear driving said ring gear during operation of said differential axle assembly, wherein said pinion assembly is eccentrically mounted within a bore of the differential housing such that the gear mesh between the pinion gear and the ring gear is adjustable by rotation of said pinion assembly within said bore wherein said pinion assembly comprises:

a pinion carrier having an inner bearing and an outer bearing bore with concentric centerlines and an outer circumferential surface with an eccentric centerline relative to the inner and outer bearing bore centerlines;

inner and outer pinion bearings seated within the inner and outer bearing bores respectively; and a pinion shaft supported for rotation by said inner and outer pinion bearings such that an axis of rotation of said pinion shaft is aligned with the centerlines of said inner and outer bearing bores and is eccentric with respect to said centerline of said outer circumferential surface of said pinion carrier, wherein said outer circumferential surface of said pinion carrier is mounted within said bore of the differential housing.

7. A differential axle assembly with an adjustable offset between a ring gear and a pinion gear comprising:

a differential housing supporting a differential case assembly including the ring gear and differential gearing, the differential case assembly supported by said differential housing for rotation on a first pair of roller bearings; and a pinion assembly supporting said pinion gear and a pinion shaft for rotation on a second pair of roller bearings, wherein said pinion assembly is mounted eccentrically within a bore of said differential housing such that rotation of the pinion assembly within the bore adjusts an offset between the ring gear and the pinion gear.

8. The differential axle assembly according to claim 7, wherein said differential housing and said pinion assembly are joined at a bolted flange joint, said bolted flange joint comprising:

a circumferential differential housing flange surrounding said bore, said differential housing flange having threaded holes to receive screws; and a circumferential pinion carrier flange surrounding said pinion carrier, said pinion carrier flange having mounting slots for said screws to pass through, wherein the mounting slots are circumferentially extended along the pinion carrier flange to enable rotational adjustment of the pinion assembly relative to the differential housing, and upon a completed rotational adjustment, the screws are tightened.

9. The differential axle assembly according to claim 8, further comprising a shim positioned at the bolted flange joint to position the pinion gear axially with respect to its rotational axis, wherein said shim is located between the differential housing flange and the pinion carrier flange.

10. The differential axle assembly according to claim 7, further comprising shims positioned on either side of the roller bearings in the differential housing to set gear backlash and differential bearing preload.

11. The differential axle assembly according to claim 9, further comprising:

shims positioned on either side of the roller bearings in the differential housing to set gear backlash and bearing preload for the differential case assembly, wherein final adjustments are achieved by the shims positioning the differential case and the shim positioning the pinion assembly at the bolted flange joint to control the relative position of the pinion gear and ring gear.

* * * * *